(12) United States Patent
Veligdan et al.

(10) Patent No.: US 6,175,679 B1
(45) Date of Patent: Jan. 16, 2001

(54) OPTICAL KEYBOARD

(75) Inventors: James T. Veligdan, Manorville, NY (US); John D. Feichtner, Fiddletown; Thomas E. Phillips, San Diego, both of CA (US)

(73) Assignee: Brookhaven Science Associates, Upton, NY (US)

( * ) Notice: Under 35 U.S.C. 154(b), the term of this patent shall be extended for 0 days.

(21) Appl. No.: 09/346,538

(22) Filed: Jul. 2, 1999

(51) Int. Cl.[7] ....................................................... G02B 6/08
(52) U.S. Cl. ........................ 385/120; 385/115; 385/901; 340/815.42
(58) Field of Search .................... 385/15, 115, 120, 385/147, 901; 340/815.42, 815.53, 815.54

(56) References Cited

U.S. PATENT DOCUMENTS

| | | | |
|---|---|---|---|
| Re. 33,422 | * 11/1990 | Garcia, Jr. ........................... | 250/229 |
| 4,387,367 | * 6/1983 | Fisher .................................. | 340/365 |
| 4,641,026 | * 2/1987 | Garcia, Jr. .......................... | 250/229 |
| 5,034,602 | * 7/1991 | Garcia, Jr. et al. ............. | 250/227.22 |
| 5,381,502 | 1/1995 | Veligdan ............................. | 385/115 |
| 5,455,882 | 10/1995 | Veligdan ............................. | 385/116 |

* cited by examiner

*Primary Examiner*—John D. Lee
*Assistant Examiner*—Jennifer Doan
(74) *Attorney, Agent, or Firm*—Reed Smith LLP

(57) ABSTRACT

An optical keyboard includes an optical panel having optical waveguides stacked together. First ends of the waveguides define an inlet face, and opposite ends thereof define a screen. A projector transmits a light beam outbound through the waveguides for display on the screen as a keyboard image. A light sensor is optically aligned with the inlet face for sensing an inbound light beam channeled through the waveguides from the screen upon covering one key of the keyboard image.

26 Claims, 4 Drawing Sheets

OPTICAL KEYBOARD

This invention was made with Government support under contract number DEAC02-98CH10886, awarded by the U.S. Department of Energy. The Government has certain rights in the invention.

BACKGROUND OF THE INVENTION

The present invention relates generally to fiber optics, and, more specifically, to optical panels.

U.S. Pat. No. 5,381,502 discloses a polyplanar optical display (POD) including ribbon optical waveguides laminated together, and having an inlet face at one end for receiving light, and a screen defined at an opposite end for displaying the light channeled through the individual waveguides with total internal reflection.

U.S. Pat. No. 5,455,882 discloses an interactive optical panel in which outbound light is channeled through the stacked waveguides for projecting an image on the screen, and inbound light may be channeled through the same waveguides and detected for providing interactive capability.

In both patents, the similarly configured optical panels permit light transmission in either direction from the inlet face to the opposite screen, or from the screen to the opposite inlet face. This capability permits the use of the optical panels in various applications for providing high definition viewing screens for televisions, computer monitors, and various other types of viewing screens as desired.

In a typical computer application, the viewing monitor is controlled by a digital computer for projecting thereon various information as required for corresponding computer programs or software. Software is typically interactive and requires input from a user which is typically provided by using a conventional keyboard having multiple keys thereon for the various letters of the alphabet and numbers, as well as specialized keys.

A keyboard may be mechanical with individually articulated keys. Another type of keyboard is known as a touch screen which overlays a viewing screen for detecting engagement of virtual keys displayed on the screen. Touch screens use optical beams or capacitance for detecting the two-dimensional (2-D) position on the screen being touched by a user for coordinating that position with virtual keys or options displayed on the screen.

A typical computer console includes discrete components such as the screen, keyboard, and internal electronics including the central processing unit (CPU), which must be suitably manufactured and integrated together with an associated cost therefor.

Accordingly, it is desired to provide an improved keyboard for various applications including use in a computer console.

BRIEF SUMMARY OF THE INVENTION

An optical keyboard includes an optical panel having optical waveguides stacked together. First ends of the waveguides define an inlet face, and opposite ends thereof define a screen. A projector transmits a light beam outbound through the waveguides for display on the screen as a keyboard image. A light sensor is optically aligned with the inlet face for sensing an inbound light beam channeled through the waveguides from the screen upon covering one key of the keyboard image.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
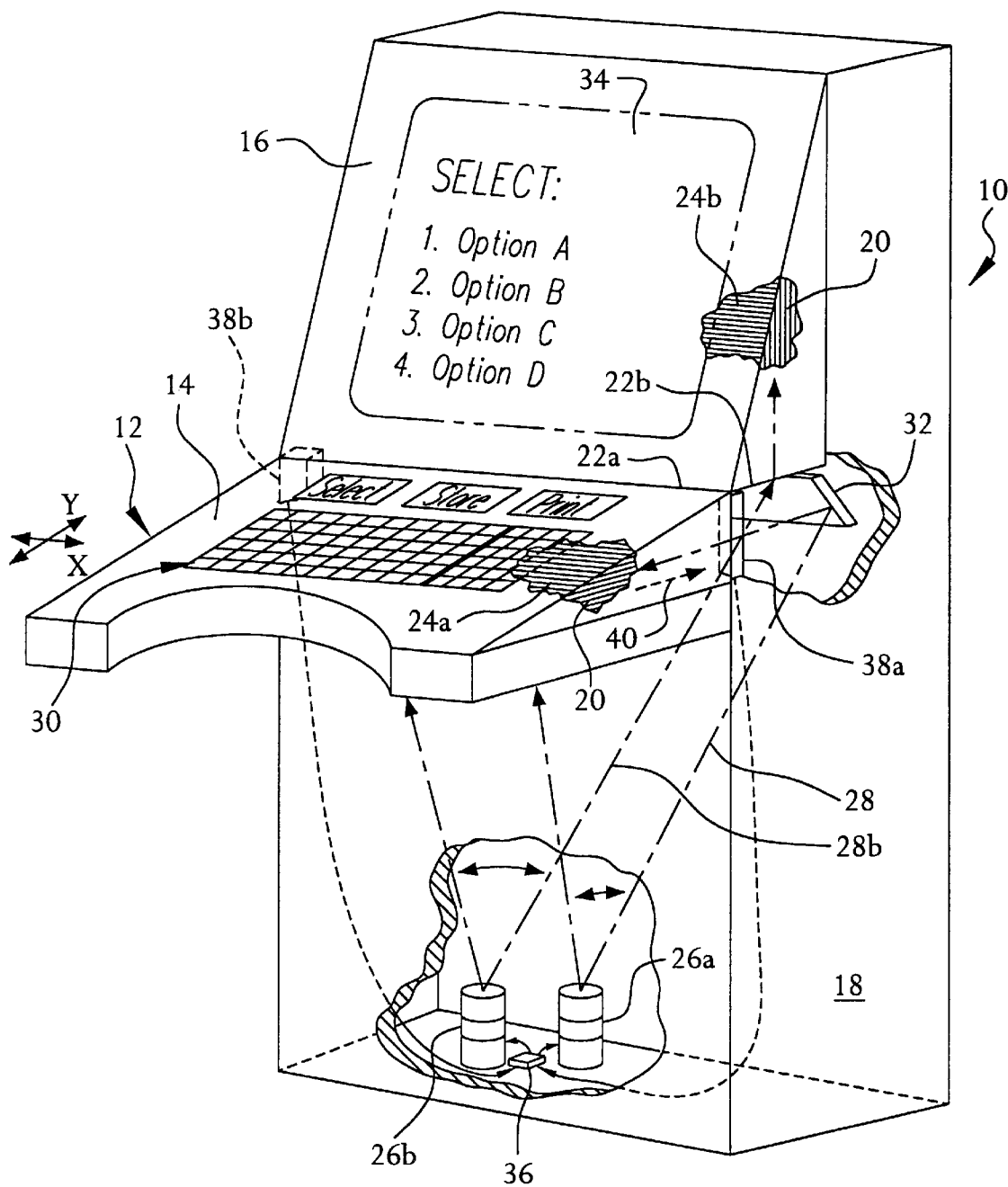
FIG. 1 is a partly sectional, isometric view of an optical computer console in accordance with an exemplary embodiment of the present invention.

Illustrated in FIG. 1 is a computer console 10 including an optical keyboard 12 in accordance with an exemplary embodiment of the present invention. The keyboard 12 is an assembly of components including a first optical panel 14 preferably positioned horizontally. A second optical panel 16 is preferably disposed vertically adjacent the horizontal panel 14, and both are suitably mounted in a housing 18 configured in an exemplary self-standing console unit.

The two optical panels 14,16 are of the conventional type known as polyplanar optical displays (PODs) disclosed in substantial detail in the above identified patents. Each optical panel includes a plurality of sheet or ribbon optical waveguides 20 which are stacked or laminated together in a relatively thin laminate of a substantial number of the waveguides as desired. First or inboard ends of the waveguides collectively define corresponding inlet faces 22a,b for the two panels, and opposite or outboard ends thereof collectively define corresponding screens 24a,b.

The first and second screens 24a,b are beveled at relatively small acute face angles of about a few degrees, for example, to position the corresponding screens almost perpendicular to the corresponding first and second inlet faces 22a,b to provide substantially thin optical panels. In a typical configuration, hundreds of the waveguides 20 may be laminated in each optical panel with a combined thickness of a few centimeters, for example. The ribbon waveguides 20 extend the full width of the panels and the degree of acute bevel of the screens controls the desired length or height of the screens.

Figure 2:
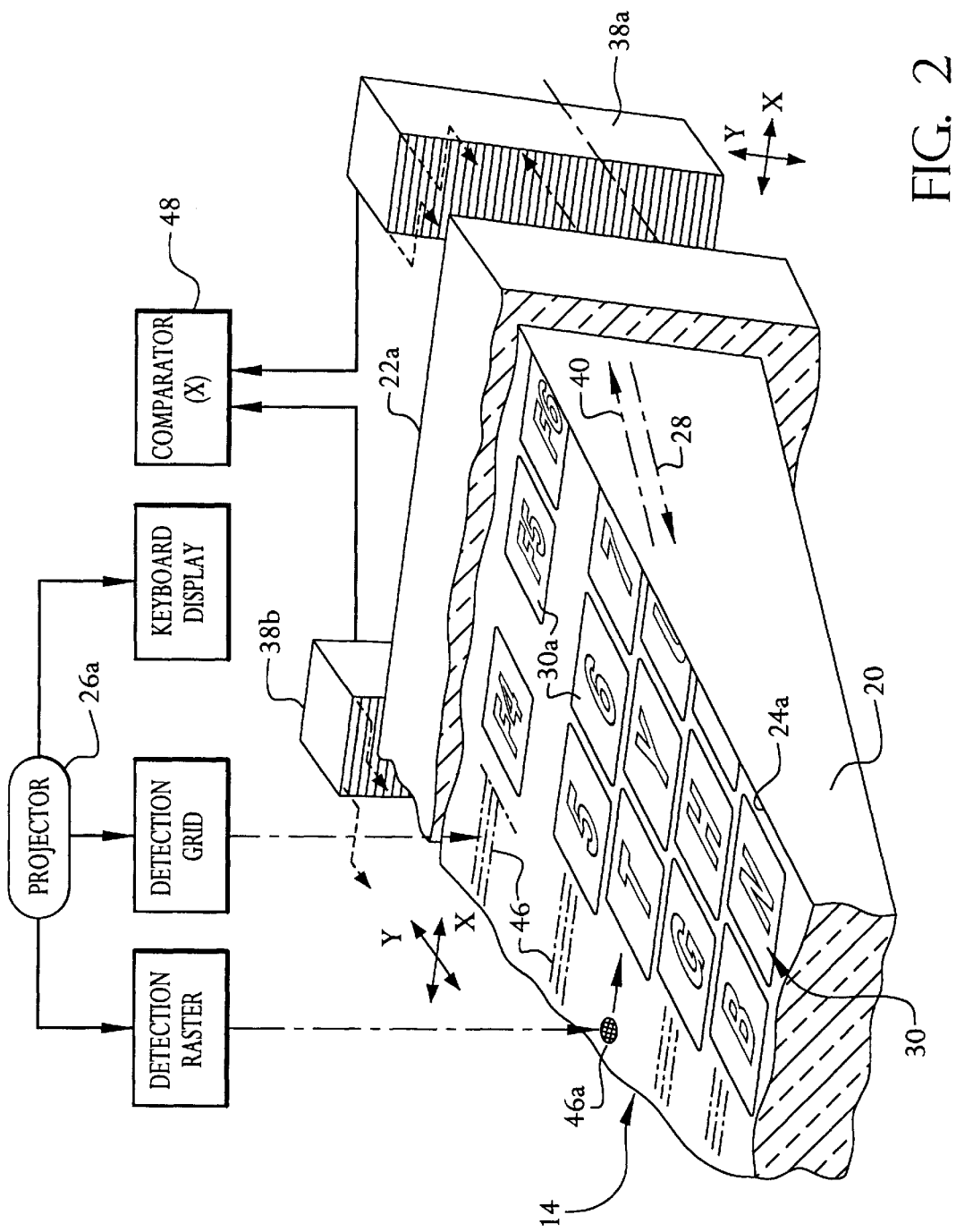
FIG. 2 is an enlarged, partly sectional view of a portion of the optical keyboard panel illustrated in FIG. 1 in accordance with exemplary embodiments.
Figure 3:
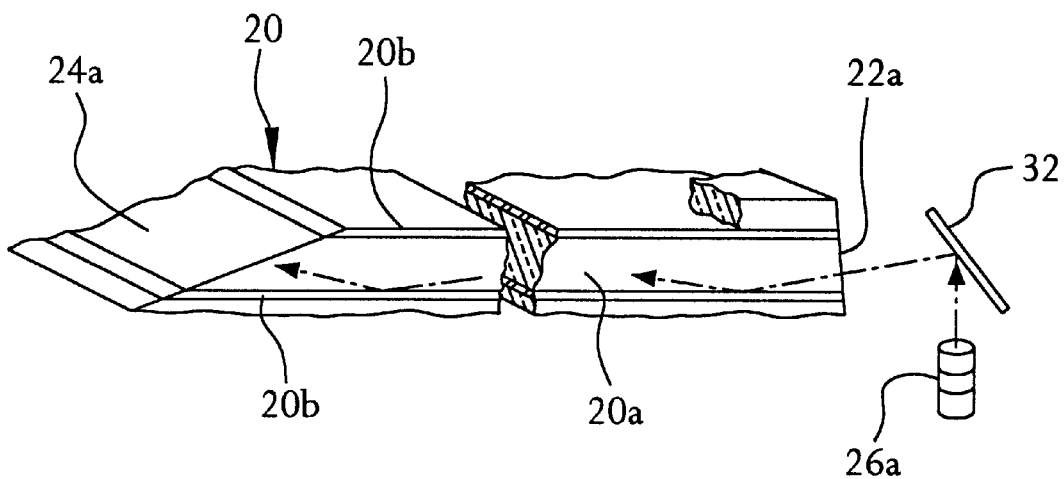
FIG. 3 is an enlarged, partly sectional view of an exemplary one of the ribbon waveguides used in the keyboard panel illustrated in FIGS. 1 and 2, as well as in the optical screen pane illustrated in FIG. 1.

A portion of the keyboard panel 14 is illustrated enlarged in more detail in FIG. 2, with a portion of an individual waveguide 20 being further enlarged in FIG. 3.

As shown in FIG. 3, each waveguide 20 includes an optically transparent core 20a, having a suitable index of refraction or refractive index, sandwiched between a pair of cladding sheets 20b having a lower refractive index. Adjacent cores in the panel laminate may be separated by common cladding sheets extending the full width and length of the individual laminates. The core and cladding may be different plastics joined together by heat or other means. Or, the cores may be glass or plastic adhesively bonded together to form cladding layers therebetween.

Both optical panels 14,16 illustrated in FIG. 1 may therefore be constructed in identical fashion with the waveguides being configured for total internal reflection of light therein for use in the exemplary computer console. Means including a first or keyboard projector 26a are suitably disposed inside the housing 18 for projecting a light beam 28 outbound through the waveguides 20 for display on the keyboard screen 24a as a keyboard image 30 which is a virtual representation of any desired keyboard. The keyboard image 30 is illustrated in more detail in FIG. 2 and includes a plurality of individual image keys 30a projected on the keyboard screen 24a.

As shown schematically in FIG. 1, the keyboard projector 26a may have any conventional configuration including a suitable light source, such as a laser or incandescent bulb, light modulator for defining the form of the keyboard image, and suitable optics for expanding the outbound beam 28 over the first inlet face 22a to project the desired keyboard image on the screen. The beveled ends of the individual waveguides may be frosted to diffuse the outbound beam thereat for improving the angle of viewing of the virtual keys formed thereby.

In FIG. 1, the keyboard projector 26a is mounted near the bottom of the housing 18 to direct the outbound beam 28 vertically upwardly toward a folding mirror 32 which reflects the beam laterally across the first inlet face 22a along the width of the panel in the X axis or direction, and transversely over the height of the stacked waveguides for display along the length of the panel in the Y axis or direction. The keyboard projector 26a may be otherwise optically aligned with the first inlet face 22a in any suitable manner subject to available space in the particular form of housing.

Similarly, a second or screen projector 26b is optically aligned with the second inlet face 22b of the second screen 24b for projecting a corresponding outbound light beam 28b through the waveguides thereof to form a suitable screen or output image 34 on the second screen.

In the exemplary embodiment illustrated in FIG. 1, the keyboard projector 26a and the screen projector 26b are separate and distinct, although they may be identically configured with a light source, light modulator, and suitable optics for forming the desired images on the two panels 14,16.

The console illustrated in FIG. 1 also includes suitable electronics including a digitally programmable computer 36 operatively joined to both projectors 26a,b for controlling images on the corresponding screens 24a,b.

As initially shown in FIG. 1, the optical keyboard 12 further includes means including at least one light sensor 38a for detecting or sensing an inbound light beam 40 channeled back through the waveguides from the keyboard screen 24a upon covering one of the keys. As shown in more particularity in FIG. 2, the light sensor 38a is optically aligned with a plurality of the waveguides 20 at least corresponding with all the keys 30a of the keyboard for discriminating individual keys upon detecting the inbound beam corresponding therewith. The light sensor 38a extends transversely across the stack of waveguides 20, over the full number thereof if desired, along the keyboard inlet face 22a for discriminating position or location of the inbound beam at the keyboard screen 24a, such as its Y coordinate position.

The light sensor 38a is operatively joined to the computer 36 and may be operated in various manners for sensing the inbound light beam 40 to determine two-dimensional (2D) position of the inbound beam at the keyboard screen 24a along both the X and Y axes.

For example, the light sensor 38a is illustrated in an exemplary embodiment in FIG. 2 in the form of a conventional linear diode array with individual photodiodes corresponding with the many waveguides 20 for individually detecting in which waveguide the inbound beam is transmitted. The light sensor may include diodes in a 1:1 correspondence with the individual waveguides for detecting light independently therein. A suitable light sensor is a linear image sensor which is a monolithic, self-scanning, photo-diode array having 1,024 diodes therein as available from Hamamatsu Corporation of Japan. This exemplary sensor is effective for detecting visible through infrared (IR) light as described in more detail hereinbelow.

Figure 4:
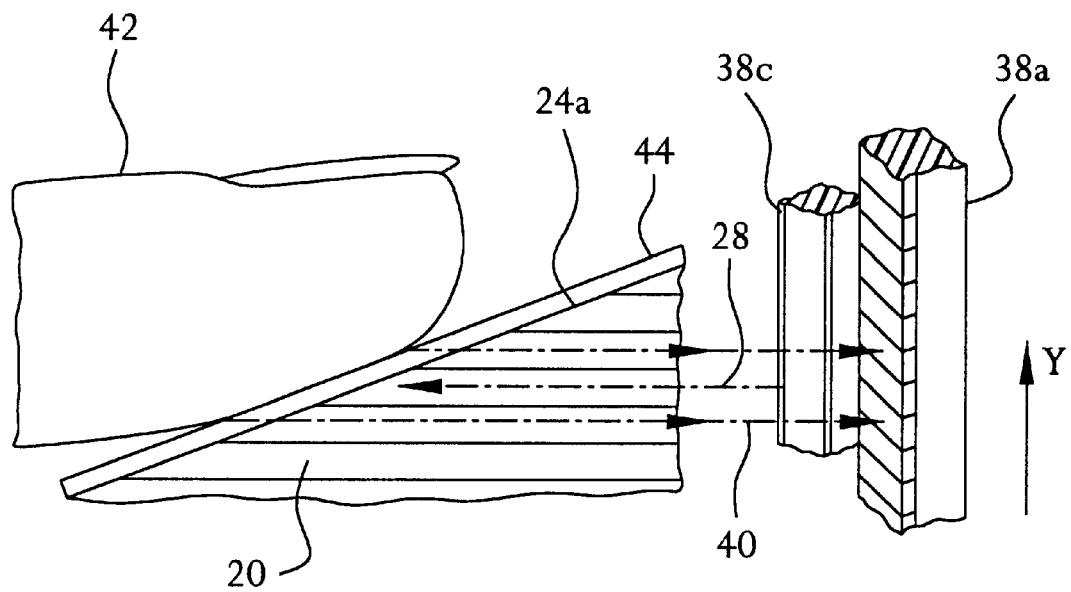
FIG. 4 is an enlarged, partly sectional view of a portion of the keyboard panel illustrated in FIG. 2 activated by touch in accordance with an exemplary embodiment of the present invention.

An enlarged section of the keyboard 24a is illustrated in FIG. 4 cooperating with the linear diode array light sensor 38a, shown in part. In typical operation, the outbound beam 28 is channeled through the waveguides for display on the screen 24a. An operator or user of the console may then press a finger 42 atop one of the virtual keys displayed on the screen for inputting into the computer the corresponding data identified by the specific key being covered by the finger. For example, the virtual keys may be the various letters of the alphabet or various numerals from zero through nine, or may be specialized keys as desired.

Since the finger is warm, it generates its own IR energy which may be channeled back through the waveguides for detection by the light sensor. However, this may provide a weak signal, or no signal at all if the finger itself is cold or covered.

In a preferred embodiment, the outbound beam 28 encounters the finger covering several of the waveguides and is reflected thereby back into the waveguides to define the inbound light beam 40 as the local reflection of the outbound beam. Human skin is not only partly reflective, but is translucent for reflecting back the outbound beam over several adjoining waveguides.

If desired, the keyboard panel may also include a transparent plastic cover 44 as shown in FIG. 4 laminated atop the screen 24a for transmitting the reflected inbound beam into the waveguides as a key is covered. In this way, the outbound beam first passes through the cover 44 prior to engaging the finger, and is then reflected off the finger and back through the cover into several of the waveguides for transmission back to the light sensor 38a.

The light sensor 38a may be located at any convenient position along the width of the first panel 14 since the inbound beam may be detected across the full width of the waveguide sheets thereof. In this way, the light sensor does not interfere with the outbound beam being transmitted through the remainder of the first inlet face.

The keyboard panel 14 illustrated in FIG. 2 is thusly capable of both displaying the desired keyboard image 30 using the outbound beam 28 while also providing a return path for the inbound beam 40 created when one or more of the waveguides is covered at the screen. Since the keyboard screen 24a is an optical device it is subject to ambient or background light which must be distinguished from the reflected inbound beam corresponding with covering of individual keys. This may be effected in various manners.

For example, the sensing means including the light sensor 38a and computer 36 joined thereto may be configured for detecting the inbound beam simultaneously as the outbound beam is projected by the keyboard projector 26a using visible light, IR light, or both. In one configuration, the keyboard projector 26a is configured for projecting the outbound beam 28 at a wavelength substantially equal to the wavelength of the inbound beam 40.

In an alternate embodiment, the projector 26a may be configured for projecting the outbound beam at a wavelength which is different than the wavelength of the inbound beam. In this example, the outbound beam may be visible light, whereas the inbound beam may be IR light for providing enhanced contrast therebetween and a large signal to noise ratio.

Since the light sensor 38a is capable of detecting light in the wavelengths corresponding with visible and infrared, it may be optionally covered with a IR pass band filter for transmitting thereto solely IR light corresponding with the IR inbound beam to distinguish or discriminate over the outbound beam and any other visible light which may be carried through the waveguides.

Figure 5:
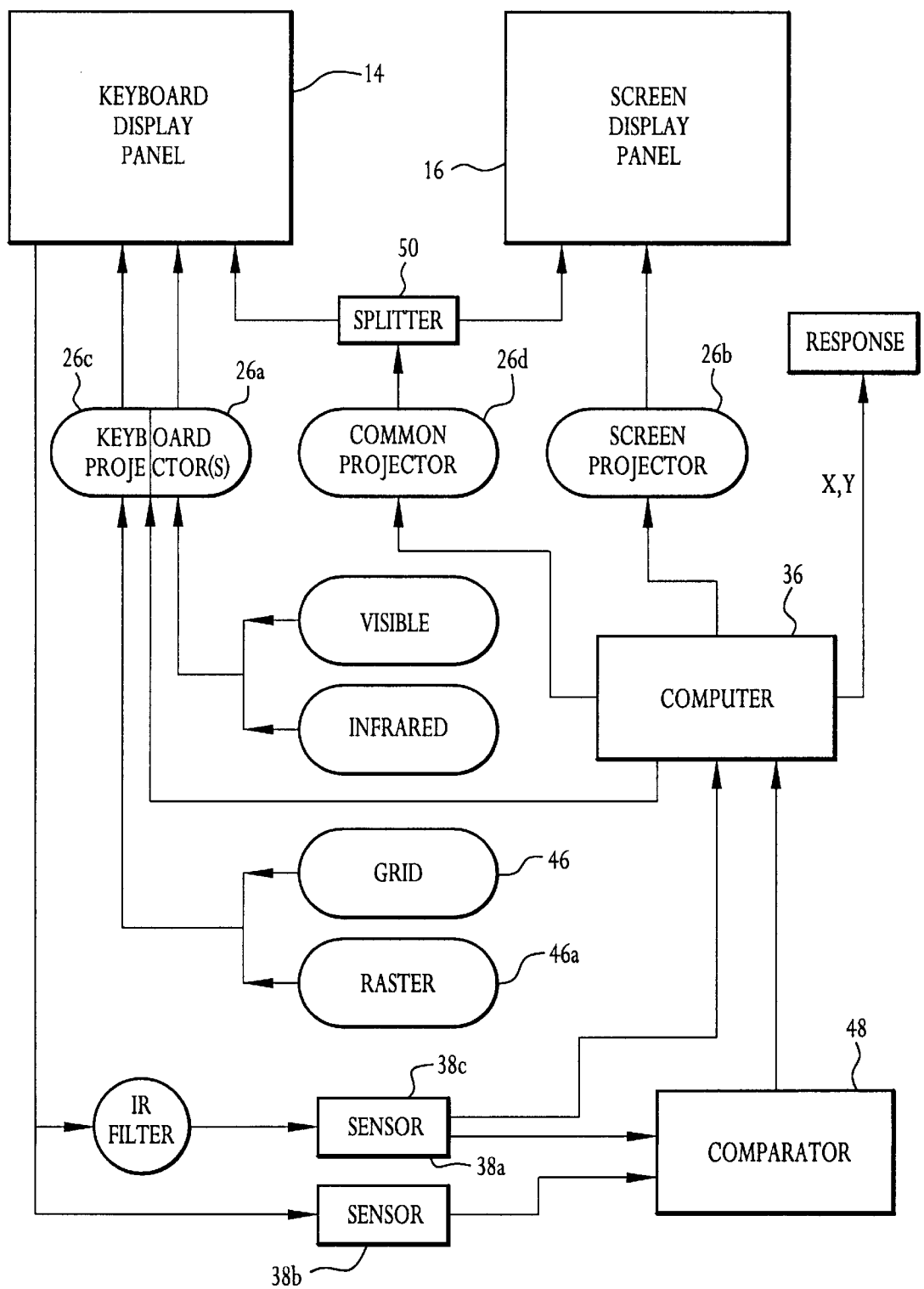
FIG. 5 is a flowchart representation of various embodiments of the keyboard and screen display panels illustrated in FIG. 1 in combination with projectors and sensors associated therewith.

As shown schematically in FIG. 1 and in flowchart form in FIG. 5, the keyboard projector 26a may be configured for projecting both visible and IR light from a common light source for simultaneous transmission through the waveguides as the outbound beam defining the keyboard image. Upon covering an individual key as illustrated in FIG. 4, both the visible and IR light are reflected back into the screen as the inbound beam 40. The light sensor 38a may therefore include the IR pass band filter across its diodes for detecting only the IR light. In this way, the light sensor may be tuned for detecting only IR light for increasing contrast and detection sensitivity over the visible light also being transmitted through the common waveguides in opposite directions.

In another configuration illustrated schematically in FIG. 2, the keyboard projector 26a as driven by the computer is effective for projecting the outbound beam in the keyboard image 30 intermittently with the projection of the outbound beam in a position grid 46, which is another image corresponding with the keyboard image. In this way, the keyboard image may be displayed in a relatively fast cycle of repeating image frames, alternating as desired with image frames for the position grid 46 for decoupling projection of the keyboard image from detection of covered keys thereof.

A particular advantage of this decoupling is that the position grid 46 may be tailored independently of the keyboard image 30 for increasing discrimination or contrast between the outbound and inbound beams for improving detection capability. For example, the projecting means may be configured for projecting the outbound beam in fewer waveguides 20 for the position grid 46 than for the keyboard image 30.

As shown in FIG. 2, each virtual key 30a may have a rectangular configuration of finite area each covering several waveguides 20 at their screen ends illustrated in more detail in FIG. 4. The position grid 46, in contrast, may be narrow bands of light in a few adjoining waveguides centered transversely along the Y axis in corresponding ones of the keys. One key may cover tens of the beveled ends of the waveguides whereas the position grid may cover only a few thereof.

Accordingly, many of the waveguides remain blank of outbound light between the corresponding elements of the position grid, and become available for transmitting the inbound beam 40 therethrough.

Correspondingly, the computer cooperating with the linear array light sensor 38a may be configured so that the sensing means detect the inbound beam only in the blank waveguides and not in those waveguides through which the position grid is transmitted. In this way, only those individual diodes corresponding with the blank waveguides are used in detecting the inbound beam reflected therethrough simultaneously with the outbound beam being transmitted through the remaining waveguides. The inbound beam is thusly decoupled from the outbound beam for providing enhanced contrast and detection sensitivity.

In this way, the same keyboard projector 26a may be configured for projecting visible light to form both the keyboard image 30 and the position grid 46. The light sensor 38a will thusly detect visible light which may be contrasted with background or ambient light in the waveguides by preferentially monitoring the blank waveguides for reflected inbound light as a key is covered.

Since the linear diode array illustrated in FIGS. 1 and 2 extend across the several waveguides at their inlet face and may include a photodiode optically aligned with a respective waveguide, the transverse location along the Y axis of the inbound beam from the keyboard screen is readily determined by which photodiode is light activated. In order to additionally determine the lateral location along the X axis of the source of the inbound beam atop the keyboard screen, the sensing means preferably include a pair of substantially identical linear diode array light sensors 38a,b. The two light sensors extend transversely across the waveguides at their inlet face, and are spaced laterally apart from each other preferably at opposite ends of the inlet face to avoid interference with the outbound beam directed thereat.

The two light sensors 38a,b are operatively joined to a conventional electronic comparator 48 cooperating with the computer which determines the relative intensity of the inbound beam detected thereby from which the lateral X position of the covered key may be accurately determined. The Y position of the covered key is determined by identifying which of the waveguides carries the inbound beam. In this way, the accurate 2D position of any one of the covered keys of the keyboard screen may be determined from the location of the inbound beam emanating therefrom.

Since the keyboard image 30 and the position grid 46 illustrated in FIG. 2 are created by projected light, they may have any desired configuration, including the same or different configurations. They, therefore may be displayed either simultaneously or intermittently as desired depending upon the contrast requirements for detecting covered keys over background noise in the form of incident ambient light.

In one embodiment, the projecting means including the keyboard projector 26a and the driving computer 36 are effective for projecting the outbound beam in the position grid 46 corresponding simultaneously with the keyboard image 30. Both images may be visible light, or the former may be visible and the latter IR light, for example.

The sensing means including the light sensors are correspondingly configured for determining lateral, X position and transverse, Y position of any one of the covered keys upon detection of the inbound beam from the position grid.

The optical keyboard may be substantially simplified by configuring the projecting means for rastering the outbound beam in a position grid at the keyboard screen corresponding with the keyboard image. As shown in FIG. 2, the individual elements of the position grid may be defined as a travelling or a raster element 46a having any suitable form such as a local spot or the narrow strips formed by illuminating only some of the several waveguides under each of the virtual keys.

Accordingly, instead of having a complete position grid displayed substantially simultaneously for all the virtual keys, the grid may be formed sequentially by temporarily positioning the raster element 46a at each virtual key position in a sequential cycle. This may be effected in a fraction of a second and is imperceptible to a user.

The sensing means may then be substantially simplified to use a single light sensor in the form of the linear diode array 38a or 38b, for example, or may be a single-element photodiode 38c as shown in FIG. 4. The single light sensor extends transversely across the several waveguides at the inlet face 22a illustrated in FIG. 2. In this configuration the actual 2D location of the raster element is predetermined and controlled by the electronics creating the position grid. Since the raster element 46a is repositioned in turn from key to key on the keyboard screen, its X,Y position is known for each of the virtual keys.

The function of the single light sensor is therefore limited to detecting the presence of the inbound beam when any one of the virtual keys is covered. When the inbound beam is detected, the computer instantaneously determines the position of the raster element corresponding thereto from which is determined the identity of the corresponding virtual key being covered.

A single light sensor is sufficient for this rastering embodiment and requires only a single photodiode traversing the inlet face. A second light sensor and the comparator are not required in this embodiment. Contrast over background noise is enhanced, and the rastering and key detection may be effected in a digital circuit specifically configured therefor at relatively low cost.

As indicated above, a single keyboard projector 26a may be configured to emit a visible outbound beam both for displaying the virtual keys on the keyboard screen as well as for rastering the raster element 46a of the corresponding position grid. In this configuration, the projecting means are effective for projecting the visible outbound beam in the keyboard image 30 intermittently with rastering the outbound beam in the position grid corresponding thereto. The keyboard image may thusly be projected in alternating frames which is a substantially continuous image to a user. The position grid is intermittently projected between keyboard frames and is effectively invisible to the user. For example, individual projection frames may be formed and displayed in a small fraction of a second for up to about a hundred frames per second.

In an alternate embodiment illustrated in FIG. 5, the projecting means may include the first keyboard projector 26a specifically configured for displaying only the keyboard image including its keys on the keyboard screen. And, a second keyboard projector 26c may be provided and dedicated for rastering its outbound beam in the position grid 46 including the raster element 46a atop the keyboard screen.

In this configuration the keyboard projector 26a may be configured to emit a visible beam, whereas the grid projector 26c is configured to emit an infrared outbound beam. The two projectors and their driving electronics may therefore be tailored to their different requirements for reducing complexity of the configurations thereof while maximizing performance.

In yet another configuration illustrated in FIG. 5, a common, single projector 26d may be used to combine the separate functions of the output screen projector 26b, the keyboard projector 26a and the grid projector 26c, or various combinations thereof. In this configuration, the common projector 26d must be configured to separately drive both optical panels 14,16 for their required functions. The common outbound beam from the common projector 26d may be suitably split in a conventional splitter 50 for diverting a portion of the outbound beam to the keyboard panel 14 for its various functions, and a portion of the outbound beam to the screen panel for its output display function.

In one embodiment, the splitter 50 may include a mirror which is reflective or transmissive depending upon the polarization of the incident light beam. This mirror cooperates with a conventional polarizer optically aligned with the common projector 26d so that the outbound beam therefrom may be differently polarized for the requirements of the two optical panels 14,16. The outbound beam polarized in one state will be transmitted to the mirror through one of the panels, and when polarized in an opposite state will reflect off the mirror to the other panel.

The various embodiments disclosed above may be used individually or in any suitable combination thereof for tailoring performance of the system. Common or multiple light projectors may be used for displaying the virtual keyboard and position grid on the first panel 14 and the desired output images on the second panel 16. Inbound light detection for the keyboard panel 14 may be effected using a single photodiode light sensor or one or more linear array light sensors as disclosed above.

Since the two optical panels 14,16 illustrated in FIG. 1 may be structurally identical, the keyboard function may be incorporated in either panel, or a single panel may be used for both input and output functions. For example, instead of using a conventional touch screen monitor, similar functions may be obtained by using the keyboard panel 14 in which a portion of the screen 24a is dedicated to input keys, with the remainder of the screen being used to display any desired output information as typically provided in touch screen monitors.

Furthermore, in the two panel 14,16 configuration illustrated in FIG. 1, the first screen 24a may be substantially larger than the requirements for a typical keyboard configuration, with the surrounding border being used to display any desired information including specialized control keys as desired. Since the keyboard panel 14 is an optical device through which light is transmitted either outbound or inbound, the outbound light may be used for displaying any desired information, while also being reflected by covering any portion of the screen for providing inbound light which is detectable. The keyboard panel 14 therefore provides a unique interactive device which may be used for various applications requiring interactive performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An optical keyboard comprising:
   an optical panel including a plurality of ribbon optical waveguides stacked together, with first ends thereof defining an inlet face, and opposite ends thereof defining a screen;
   means for projecting a light beam outbound through said waveguides for display on said screen as a keyboard image having a plurality of image keys; and
   means for sensing an inbound light beam channeled through said waveguides from said screen upon covering one of said keys.

2. A keyboard according to claim 1 wherein:
   said projecting means comprise a projector optically aligned with said inlet face for projecting said outbound beam through said waveguides for display on said screen as said keys; and said sensing means are optically aligned with a plurality of said waveguides corresponding with said keys for discriminating said keys upon detecting said inbound beam corresponding therewith.

3. A keyboard according to claim 2 wherein said sensing means comprise a light sensor extending across said waveguides at said inlet face for discriminating position of said inbound beam at said screen.

4. A keyboard according to claim 2 wherein said sensing means are effective for determining two-dimensional position of said inbound beam at said screen.

5. A keyboard according to claim 4 wherein said light sensor comprises a linear diode array corresponding with said waveguides for individually detecting said inbound beam therein.

6. A keyboard according to claim 5 wherein said sensing means are effective for detecting said inbound beam simultaneously as said outbound beam is projected by said projector.

7. A keyboard according to claim 6 wherein said projector is effective for projecting said outbound beam at a wavelength substantially equal to a wavelength of said inbound beam.

8. A keyboard according to claim 6 wherein said projector is effective for projecting said outbound beam at a wavelength different than a wavelength of said inbound beam.

9. A keyboard according to claim 8 wherein said outbound beam is visible, and said inbound beam is infrared.

10. A keyboard according to claim 6 wherein said projector is effective for projecting both visible and infrared light in said outbound beam through said waveguides, with said infrared light being reflected at said screen as said inbound beam from said covered key.

11. A keyboard according to claim 10 wherein said panel further comprises a transparent cover atop said screen for transmitting said reflected inbound beam into said waveguides upon covering said key.

12. A keyboard according to claim 5 wherein:

said projecting means are effective for projecting said outbound beam in said keyboard image intermittently with projecting said outbound beam in a position grid corresponding thereto; and said sensing means are effective for detecting said inbound beam during projection of said position grid.

13. A keyboard according to claim 12 wherein said projecting means are effective for projecting said outbound beam in fewer waveguides for said position grid than for said keyboard image, with blank waveguides therebetween.

14. A keyboard according to claim 13 wherein said sensing means are effective for detecting said inbound beam only in said blank waveguides.

15. A keyboard according to claim 14 wherein said projector is effective for projecting visible light to form both said keyboard image and said position grid.

16. A keyboard according to claim 14 wherein:

said projector is effective for projecting both visible and infrared light; and said sensor is effective for detecting only infrared light.

17. A keyboard according to claim 5 wherein said sensing means further comprise:

a pair of said light sensors extending transversely across said waveguides at said inlet face, and spaced laterally apart from each other; and a comparator operatively joined to said sensors for comparing relative strength of said inbound beam sensed thereby to determine lateral position of said covered key.

18. A keyboard according to claim 17 wherein:

said projecting means are effective for projecting said outbound beam in a position grid corresponding simultaneously with said keyboard image; and said sensing means are effective for determining lateral and transverse position of said covered key upon detection of said inbound beam from said position grid.

19. A keyboard according to claim 4 wherein:

said projecting means are effective for rastering said outbound beam in a position grid at said screen corresponding with said keyboard image; and said sensing means comprise a light sensor extending transversely across said waveguides at said inlet face, and are effective for determining lateral and transverse position of said covered key upon detection of said inbound beam corresponding with said rastered outbound beam.

20. A keyboard according to claim 19 wherein said projecting means comprise:

a first projector for displaying said keys on said screen; and a second projector for rastering said outbound beam in said position grid on said screen.

21. A keyboard according to claim 20 wherein said first projector is effective to emit a visible outbound beam, and said second projector is effective to emit an infrared outbound beam.

22. A keyboard according to claim 20 wherein said projecting means are effective for projecting said outbound beam in said keyboard image intermittently with rastering said outbound beam in said position grid corresponding thereto.

23. A keyboard according to claim 19 wherein said projector is effective to emit a visible outbound beam both for displaying said keys on said screen and for rastering said position grid.

24. A keyboard according to claim 4 in combination with:

a second optical panel including a plurality of ribbon optical waveguides stacked together, with first ends thereof defining a second inlet face, and opposite ends thereof defining a second screen disposed adjacent to said screen defining said keyboard image;

a screen projector optically aligned with said second inlet face for projecting a screen image thereon; and a computer operatively joined to both said projector for said first optical panel and said screen projector for controlling images thereon.

25. An apparatus according to claim 24 wherein said keyboard projector and said screen projector are separate.

26. An apparatus according to claim 24 wherein said keyboard projector and said screen projector are combined in a common, single projector.

* * * * *